(12) United States Patent
Youn et al.

(10) Patent No.: US 11,745,621 B2
(45) Date of Patent: Sep. 5, 2023

(54) METHOD FOR EQUALIZING STATES OF CHARGE (SOCS) OF BATTERY PACKS IN ELECTRIC VEHICLE

(71) Applicants: Hyundai Motor Company, Seoul (KR); Kia Corporation, Seoul (KR)

(72) Inventors: Kil Young Youn, Suwon-Si (KR); Jung Moon Chang, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 17/519,276

(22) Filed: Nov. 4, 2021

(65) Prior Publication Data
US 2022/0324350 A1 Oct. 13, 2022

(30) Foreign Application Priority Data
Apr. 13, 2021 (KR) .................. 10-2021-0047905

(51) Int. Cl.
*B60L 58/22* (2019.01)
*B60L 58/26* (2019.01)
*B60L 58/13* (2019.01)

(52) U.S. Cl.
CPC .............. *B60L 58/22* (2019.02); *B60L 58/13* (2019.02); *B60L 58/26* (2019.02)

(58) Field of Classification Search
CPC .......... B60L 58/22; B60L 58/13; B60L 58/26; B60L 2240/545; B60L 58/27; B60L 58/12; B60L 2240/547; H02J 7/0016; H02J 7/0048; H02J 2310/48; Y02T 10/70; Y02T 10/7072; B60Y 2200/91; B60Y 2400/3086

(Continued)

(56) References Cited

U.S. PATENT DOCUMENTS

| 5,905,360 A * | 5/1999 | Ukita ................. H02J 7/0014 320/121 |
| 8,207,740 B2 * | 6/2012 | Lin ................... H01M 10/441 320/119 |
| 8,766,597 B2 * | 7/2014 | Nork ................. H02J 7/0014 320/136 |

(Continued)

FOREIGN PATENT DOCUMENTS

| CN | 102761166 A | * | 10/2012 | |
| CN | 103138328 A | * | 6/2013 | ............ B60L 1/003 |

(Continued)

*Primary Examiner* — M Baye Diao
(74) *Attorney, Agent, or Firm* — MORGAN, LEWIS & BOCKIUS LLP

(57) ABSTRACT

A method for equalizing SOCs of battery packs in an electric vehicle, may include acquiring, by a controller, SOC information of the battery packs from battery pack state information acquired by state detectors under predetermined conditions of the electric vehicle, determining, by the controller, an average SOC value of the battery packs based on acquired SOC values of the respective battery packs, determining, by the controller, at least one battery pack required to be discharged for equalization of the SOCs of the battery packs among all the battery packs based on the SOC values of the respective battery packs and the determined average SOC value of the battery packs, and operating, by the controller, an electric load connected to the at least one determined battery pack required to be discharged to discharge the at least one determined battery pack required to be discharged.

17 Claims, 2 Drawing Sheets

(58) Field of Classification Search
USPC .......................................................... 320/132
See application file for complete search history.

(56) References Cited

U.S. PATENT DOCUMENTS

| | | | | |
|---|---|---|---|---|
| 9,885,757 | B2* | 2/2018 | Liu .................... | G01R 31/3835 |
| 10,793,019 | B2* | 10/2020 | Duan .................... | H02J 7/0016 |
| 10,850,725 | B2* | 12/2020 | Tabatowski-Bush ........................ | |
| | | | | B60W 20/13 |
| 11,292,360 | B2* | 4/2022 | Luo ....................... | H02J 7/0014 |
| 2012/0083948 | A1* | 4/2012 | Tate, Jr. .................. | B60L 58/12 |
| | | | | 701/22 |
| 2013/0106178 | A1* | 5/2013 | Girard ................... | H02J 7/0048 |
| | | | | 307/9.1 |
| 2016/0351976 | A1* | 12/2016 | Kawahara ........... | H01M 10/482 |
| 2018/0219391 | A1* | 8/2018 | Ishikawa ................ | B60L 58/19 |
| 2021/0263104 | A1* | 8/2021 | Zhu ..................... | H01M 10/486 |
| 2022/0271552 | A1* | 8/2022 | Gibbs ................... | H02J 7/0013 |

FOREIGN PATENT DOCUMENTS

| | | | | | |
|---|---|---|---|---|---|
| CN | 105083037 | A | * | 11/2015 | .............. B60L 58/12 |
| CN | 107579552 | A | * | 1/2018 | .............. Y02E 60/10 |
| CN | 105811500 | B | * | 3/2018 | ............. H02J 7/0016 |
| CN | 107839500 | A | * | 3/2018 | .............. B60L 58/12 |
| CN | 108583326 | A | * | 9/2018 | .............. B60L 58/22 |
| CN | 109672240 | A | * | 4/2019 | ............. H02J 7/0019 |
| CN | 112054571 | A | * | 12/2020 | ......... H01M 10/441 |
| JP | 4016516 | B2 | * | 12/2007 | ................ H02J 7/00 |
| WO | WO-2012049973 | A1 | * | 4/2012 | ........ G01R 31/3606 |

* cited by examiner

METHOD FOR EQUALIZING STATES OF CHARGE (SOCS) OF BATTERY PACKS IN ELECTRIC VEHICLE

CROSS-REFERENCE TO RELATED APPLICATION

The present application claims priority to Korean Patent Application No. 10-2021-0047905 filed on Apr. 13, 2021, the entire contents of which is incorporated herein for all purposes by this reference.

BACKGROUND OF THE INVENTION

Field of the Invention

The present invention relates to a method for equalizing the SOCs of battery packs. More particularly, it relates to a method for equalizing the SOCs of battery packs in an electric vehicle.

Description of Related Art

An electric vehicle (EV) utilizes batteries as a main power source, and operates a motor using the power of the batteries, acquiring driving force necessary to drive the vehicle. High-voltage batteries are used as the batteries provided in the electric vehicle.

In general, batteries of about 360 V are provided in passenger electric vehicles, and commercial electric vehicles, such as an electric bus, have a voltage system of 600 V or more, which is greater than the level of that of the passenger electric vehicles. Further, the commercial electric vehicles require a greater battery SOC than the battery SOC value of the passenger electric vehicles.

Because the SOC value of batteries required by the commercial electric vehicles is greater than the SOC value of batteries required by the conventional passenger electric vehicles, a larger number of batteries needs to be mounted in the commercial electric vehicles, and to mount a large number of batteries in an electric vehicle, a serial and parallel combined connection method rather than a serial connection method, which was applied to the conventional passenger commercial vehicles, is applied.

However, because batteries are mounted in a commercial electric vehicle using the serial and parallel combined connection method, an available driving distance of the vehicle is reduced in the short term and the lifespan of the batteries is shortened due to voltage and SOC unbalances among battery packs.

Balance among battery packs used in an electric vehicle may be lost depending on the manufacturing methods of the batteries, the amounts of a material of the batteries, an operating temperature, etc. Therefore, batteries for passenger electric vehicles are balanced using a balancing circuit, such as passive discharge using resistance, active balance using an external apparatus, or the like.

However, because commercial electric vehicles requires a larger number of batteries due to requirements of a larger amount of energy and power than the passenger electric vehicles, unbalance among battery packs is more serious, and thus, technology for equalization of SOCs of battery packs in a commercial electric vehicle, such as an electric bus, is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for equalizing the SOCs of battery packs in an electric vehicle.

Various aspects of the present invention are directed to providing a method for equalizing states of charge (SOCs) of battery packs in an electric vehicle, the method including acquiring, by a controller, SOC information of the battery packs from battery pack state information acquired by state detectors under predetermined conditions of the electric vehicle, determining, by the controller, an average SOC value of the battery packs based on acquired SOC values of the respective battery packs, determining, by the controller, at least one battery pack required to be discharged for equalization of the SOCs of the battery packs among all the battery packs based on the SOC values of the respective battery packs and the determined average SOC value of the battery packs, and operating, by the controller, an electric load connected to the at least one determined battery pack required to be discharged to discharge the at least one determined battery pack required to be discharged.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
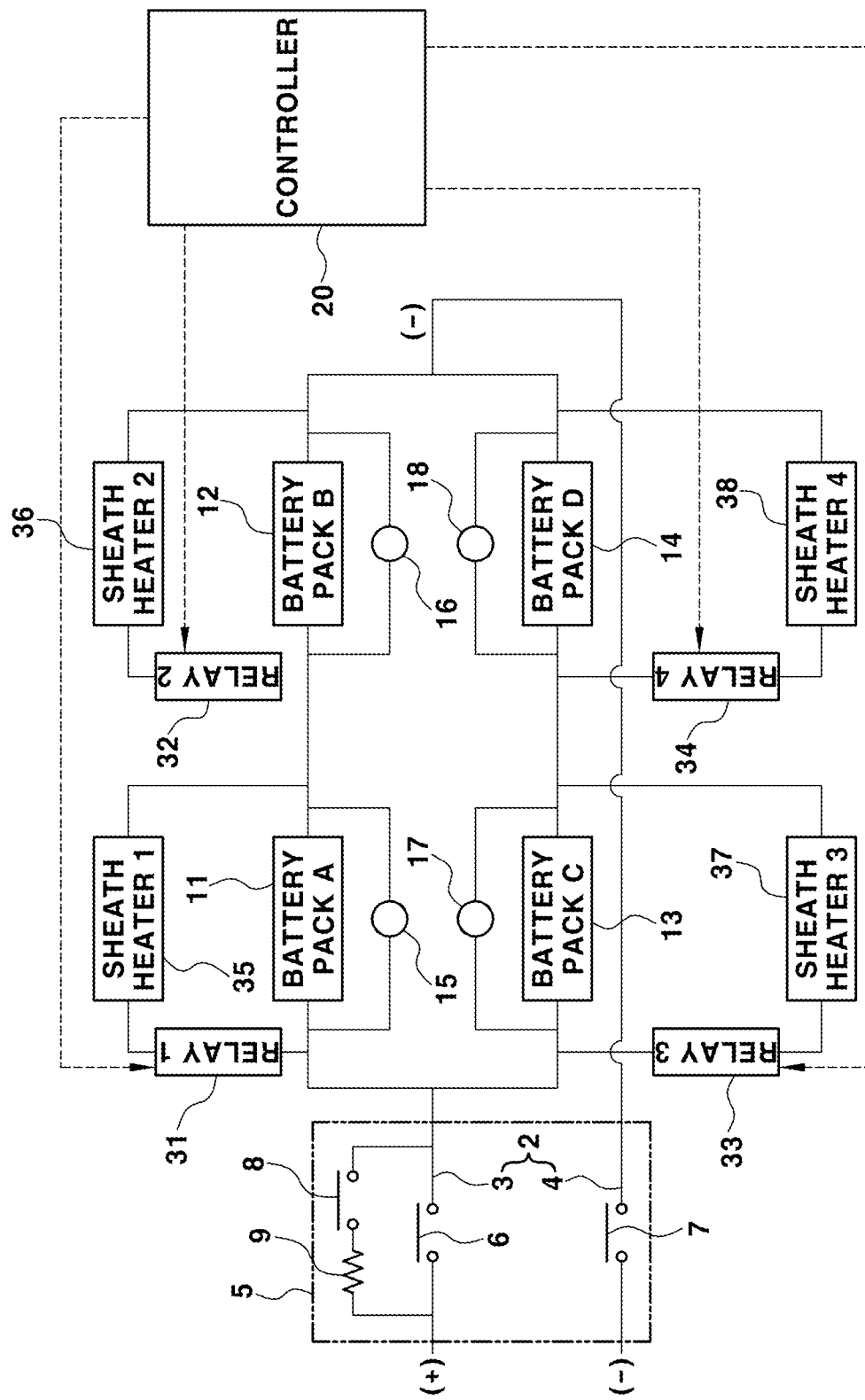
FIG. 1 is a circuit diagram illustrating the configuration of an apparatus of equalizing the SOCs of battery packs according to various exemplary embodiments of the present invention.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes, will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structures or functional descriptions which will be disclosed below in embodiments of the present invention are exemplarily provided to describe the exemplary embodiments of the present invention, and the exemplary embodiments of the present invention may be implemented in various different forms. While the present invention will be described in conjunction with exemplary embodiments of the present invention, it is to be understood that the present description is not intended to limit the present invention to the exemplary embodiments. On the other hand, the present invention is directed to cover not only the exemplary embodiments of the present invention, but also various alternatives, modifications, equivalents and other embodiments, which may fall within the spirit and scope of the present invention as defined by the appended claims.

In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the present invention.

When an element or layer is referred to as being "connected to" or "coupled to" another element or layer, it may be directly connected to or coupled to the other element or layer, or intervening elements or layers may be present. In contrast, when an element is referred to as being "directly connected to" or "directly coupled to" another element or layer, there may be no intervening elements or layers present. Other words used to describe the relationships between elements, e.g., "between" versus "directly between," "adjacent" versus "directly adjacent," etc., should be interpreted in a like fashion.

In the following description of the embodiments, the same elements are denoted by the same reference numerals even when they are depicted in different drawings. The terminology used herein is for the purpose of describing particular exemplary embodiments only and is not intended to be limiting. In the following description of the embodiments, singular expressions may encompass plural expressions unless they have clearly different contextual meanings. In the following description of the embodiments, a term, such as "comprises" and/or "comprising", etc., is to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or the possibility of adding the same.

Hereinafter, reference will be made in detail to various embodiments of the present invention, examples of which are illustrated in the accompanying drawings and described below.

Figure 2:
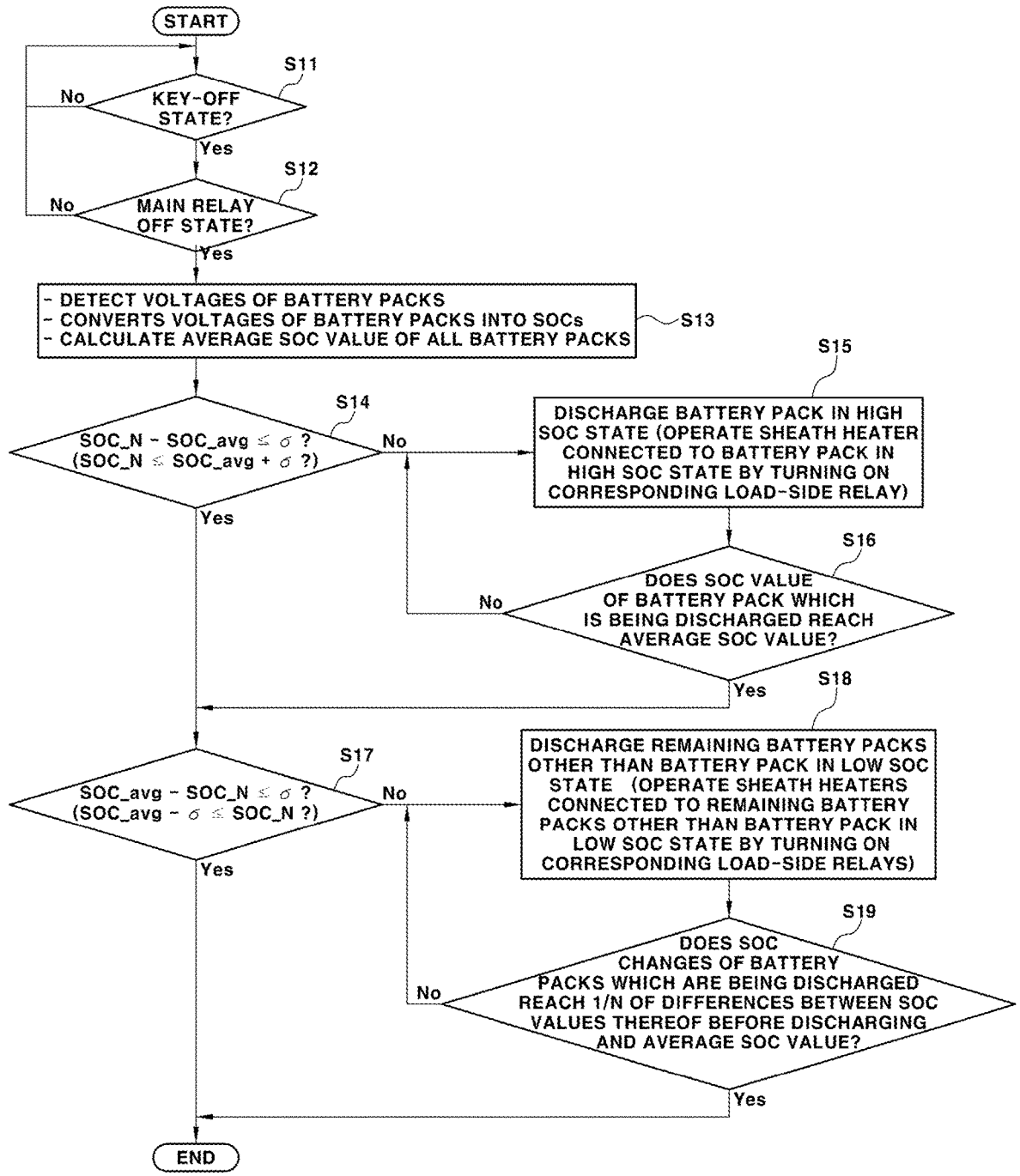
FIG. 2 is a flowchart representing a control process for equalizing the SOCs of battery packs according to various exemplary embodiments of the present invention.

FIG. 1 is a circuit diagram illustrating the configuration of an apparatus of equalizing the SOCs of battery packs according to various exemplary embodiments of the present invention, and FIG. 2 is a flowchart representing a control process for equalizing the SOCs of battery packs according to various exemplary embodiments of the present invention.

The present invention relates to a control method of an electric vehicle in which a plurality of battery packs 11-14 is mounted, and to a method for equalizing the SOCs of a plurality of battery packs 11-14 mounted in an electric vehicle.

Here, the electric vehicle may be a commercial electric vehicle, such as an electric bus. Further, the battery packs 11-14 may be battery packs which are connected through the serial and parallel combined connection method. The SOC of the battery pack may mean the state of charge of the battery pack indicating the remaining capacity of the battery pack. Furthermore, a battery, which will be described hereinafter, means a battery in units of a pack, i.e., a battery pack, and thus, the battery means the battery pack unless they are stated distinctively.

In various exemplary embodiments of the present invention, sheath heaters 35-38, which are provided to raise the temperature of coolant in commercial electric vehicles, are used to equalize the SOCs of the battery packs 11-14 connected through the serial and parallel combined connection method. For reference, the sheath heaters 35-38 are heaters configured to heat coolant in electric vehicles.

An electric vehicle is a vehicle which travels using the power of a motor driven by power supplied from batteries, and in the electric vehicle without a high-temperature heat source, such as an engine, it is difficult to heat coolant in a short time period. Therefore, the electric vehicle is provided with separate coolant heaters configured to heat the coolant in a short time period, and sheath heaters, which are electric heaters using a positive temperature coefficient thermistor (PCT), are widely used as the coolant heaters. In various exemplary embodiments of the present invention, the sheath heaters 35-38 are used to facilitate equalization of the SOCs of the battery packs 11-14.

Further, a water cooled-type cooling system configured to cool batteries using coolant is generally provided in an electric vehicle. In the water cooled-type cooling system, the coolant cools the batteries while the coolant circulated along a coolant line passes through coolant passages in the batteries. Further, in the electric vehicle, it is necessary to raise the temperature of the batteries under a low-temperature condition. Here, the coolant is used to raise the temperature of the batteries, and to raise the temperature of the batteries, the coolant circulated along the coolant line is heated. Here, the sheath heater is used as the coolant heater.

The sheath heater is provided to heat the coolant to raise the temperature of the batteries in a short time period in the electric vehicle without a high-temperature heat source, such as an engine, and while the coolant heated by the sheath heater passes through the coolant passages in the batteries, the coolant may rapidly raise the temperature of the batteries.

When the battery packs of the electric vehicle are connected through the serial and parallel combined connection method, if voltage and SOC unbalances among the battery packs occur, the available driving distance of the vehicle may be reduced in the short term and the lifespan of the batteries may be shortened. Therefore, in various exemplary embodiments of the present invention, the SOCs of all the battery packs 11-14 are equalized by discharging some of the battery packs 11-14 as much as necessary using the sheath heaters 35-38.

The discharge of the battery corresponds to consumption of electrical energy stored in the battery pack and may thus be a loss, and in spite of such a loss, equalization of the SOCs of the battery packs 11-14 may be preferentially considered to solve unbalances among the battery packs 11-14 which may cause shortening of the lifespan of the battery packs 11-14.

In various exemplary embodiments of the present invention, the sheath heaters 35-38 act as electric loads in the electric vehicle which consume the electrical energy of the battery packs 11-14, are respectively connected to the battery packs 11-14 to independently receive power supplied therefrom, and are used to discharge specific battery packs for equalization of the SOCs of the battery packs 11-14.

As shown in FIG. 1, an apparatus of equalizing the SOCs of battery packs includes main relays 6 and 7, voltage sensors 15-18, a controller 20, the electric loads 35-38, and load-side relays 31-34. Referring to FIG. 1, a total of four battery packs, 11-14, i.e., battery packs A-D, which are connected through the serial and parallel combined connection method, is mounted in the electric vehicle.

Here, two battery packs, i.e., the battery packs A and B, are connected in series to form one group, other two battery packs, i.e., the battery packs C and D, are connected in series to form another group, and the two groups are connected in parallel (a 2 by 2 configuration). The illustrated number or connection state of the battery packs 11-14 is merely exemplary, and does not limit the present invention, and the number or the connection state of battery packs may be variously modified.

For example, two battery packs may be connected in series to form each group and three groups configured in the present manner may be connected in parallel (a 2 by 3 configuration), or three battery packs may be connected to series to form each group and two groups configured in the present manner may be connected in parallel (a 3 by 2 configuration).

In various exemplary embodiments of the present invention, the electric loads 35-38, i.e., the sheath heaters 35-38, used for equalization of the SOCs of the battery packs 11-14 are connected to the battery packs 11-14 one by one, and may independently receive power supplied from the corresponding battery packs 11-14. Further, when each of the sheath heaters 35-38 is operated, it is exothermically operated while consuming the power of a corresponding one of the battery packs 11-14, thus heating coolant. Accordingly, when a sheath heater is operated, the sheath heater consumes the power of the corresponding battery pack connected thereto, and thus the SOC value of the corresponding battery pack is reduced.

Further, the load-side relays 31-34, i.e., relays 1-4, are provided in respective electric circuits between the battery packs 11-14 and the sheath heaters 35-38, and the load-side relays 31-34 are connected to the controller 20 to be turned on or off depending on a control signal output from the controller 20. Accordingly, the load-side relays 31-34 are controlled to be turned on or off depending on the control signal output from the controller 20 and the corresponding sheath heaters 35-38 may selectively receive power supplied from the battery packs 11-14, and thus, the on/off operations of the respective sheath heaters 35-38 may be controlled by the controller 20.

Further, the voltage sensors 15-18, which respectively detect voltages of the corresponding battery packs 11-14, are provided adjacent to the battery packs 11-14 as state detectors configured to detect the states of the corresponding battery packs 11-14, and the respective voltage sensors 15-18 are connected to the controller 20 to transmit detected voltage values as electrical signals thereto. Further, current sensors, which respectively detects currents of the corresponding battery packs 11-14, are provided in a conventional battery management system, and are connected to the controller 20 to transmit detected current values as electrical signals thereto.

Further, detection elements used to detect or collect the states of the battery packs 11-14 may be further provided in the conventional battery management system, and for example, although not shown in FIG. 1, temperature sensors configured to detect the temperatures of the battery packs 11-14 may be provided. Accordingly, the controller 20 may acquire battery state information detected by the above-stated sensors or detection elements.

Further, in various exemplary embodiments of the present invention, the controller 20 may be the controller of a battery management system (BMS). The controller of the battery management system collects and monitors battery state information, and provides the collected battery state information to other controllers. Further, the controller of the battery management system performs control for battery charge and discharge and control for battery management based on the collected battery state information.

In the battery management system, a power relay assembly (PRA) 5 configured to intermit high-voltage power is provided at an output side of all the battery packs 11-14. Here, the power relay assembly 5 is provided in a DC link circuit 2 which connects the battery packs 11-14 and electric loads in the electric vehicle, such as an inverter, and includes the main relays 6 and 7, a precharge relay 8 and a precharge resistor 9.

Here, two main relays 6 and 7 are provided on a positive (+) power line 3 and a negative (−) power line 4 of the DC link circuit 2 configured to connect the battery packs 11-14 and the electric loads in the electric vehicle. That is, the main relays 6 and 7 include the main relay 6 of the positive (+) power line 3 and the main relay 7 of the negative (−) power line 3, and the precharge relay 8 and the precharge relay 9 are provided in a circuit which bypasses the main relay 6 of the positive (+) power line 3. The two main relays 6 and 7 and the precharge relay 8 are respectively turned on or off by control signals output from the controller 20.

The description of the apparatus of equalizing the SOCs of battery packs has been completed, and hereinafter, a method for equalizing the SOCs of battery packs in an electric vehicle and a process thereof will be described with reference to FIG. 2.

First, the controller 20 confirms whether or not the SOCs of the battery packs 11-14 are currently in a balanced state under predetermined conditions of the vehicle. Here, the predetermined conditions of the vehicle include the key-off state of the vehicle and the off state of the main relays 6 and 7.

In more detail, the controller 20 confirms whether or not the vehicle is in the key-off state (S11), and confirms whether or not the main relay 6 of the positive (+) power line 3 and the main relay 7 of the negative (−) power line 3 are in the off state upon confirming that the vehicle is in the key-off state (S12). Because the SOCs of the battery packs 11-14 are influenced by a load, it is necessary to confirm the SOCs of the battery packs 11-14 in the state in which there is no load. Therefore, the controller 20 confirms the SOCs of the respectively battery packs 11-14 in the key-off state in which there is no load, and in the off state of the main relays 6 and 7 (S13).

To determine the SOCs of the respective battery packs 11-14, the controller 20 utilizes the voltage values of the respective battery packs 11-14 detected by battery pack state detectors, i.e., the voltage sensors 15-18, and the controller 20 determines the SOC values of the respective battery packs 11-14 using data set from the voltage values detected by the corresponding voltage sensors 15-18. Here, a voltage vs SOC map, in which an SOC value is set depending on a voltage value, may be used to determine the set data.

Accordingly, the controller 20 determines the SOC values of the respective battery packs 11-14 from the voltage values of the battery packs 11-14 detected by the corresponding voltage sensors 15-18 using the voltage vs SOC map, and determines an average SOC value of all the battery packs 11-14 using the determined SOC values of the respective battery packs 11-14 (S13).

Thereafter, the controller 20 determines differences between the average SOC value of all the battery packs 11-14 and the SOC values of the respective battery packs 11-14, i.e., SOC deviations, and confirms whether or not the SOC deviations of the respective battery packs 11-14 are within a predetermined allowable error σ (S14). Here, when all of the determined SOC deviations of the respective battery packs 11-14 are within the allowable error σ, the controller 20 determines that the SOCs of the battery packs 11-14 are in the balanced state, and terminates the control process without a subsequent process for equalizing the SOCs of the battery packs 11-14.

In various exemplary embodiments of the present invention, in the determination as to whether or not the SOCs of the respective battery packs 11-14 are in the balanced state, the controller 20 compares the SOC values of the respective battery packs 11-14 with the average SOC value of all the battery packs 11-14 one to one, determines differences therebetween, i.e., SOC deviations of the respective battery packs 11-14, and confirms whether or not the determined SOC deviations of the respective battery packs 11-14 are within the allowable error σ.

More concretely, in the example illustrated in FIG. 1, if the SOC values of the battery packs A, B, C and D are defined as SOC_A, SOC_B, SOC_C and SOC_D, the average SOC value of all the battery packs A, B, C and D is defined as SOC_avg, and the allowable error is defined as σ, when the absolute values |SOC_A−SOC_avg|, |SOC_B−SOC_avg|, |SOC_C−SOC_avg| and |SOC_D−SOC_avg| of the SOC deviations of the respective battery packs A, B, C and D are equal to or less than the allowable error σ, the controller 20 determines that all the SOCs of the battery packs 11-14 are in the balanced state.

In the flowchart of FIG. 2, the SOC values SOC_A, SOC_B, SOC_C and SOC_D, of the battery packs A, B, C and D are collectively called SOC_N (here N=A, B, C, D), when |SOC_N−SOC_avg| is equal to or less than the allowable error σ (|SOC_N−SOC_avg| ≤σ), the controller 20 determines that all the SOCs of the battery packs 11-14 are in the balanced state, and terminates the control process without the subsequent process for equalizing the SOCs of the battery packs 11-14.

Satisfaction of the condition in which |SOC_N−SOC_avg| is equal to or less than the allowable error σ (|SOC_N−SOC_avg|≤σ) means that both the condition of SOC_N−SOC_avg≤σ in S14 and the condition of SOC_avg−SOC_N≤σ in S17 are satisfied.

On the other hand, when a first SOC deviation acquired by subtracting the average SOC value SOC_avg of all the battery packs 11-14 from the SOC value SOC_N of each of the battery packs 11-14 is greater than the allowable error σ (No in FIG. 14) or when a second SOC deviation acquired by subtracting the SOC value SOC_N of each of the battery packs 11-14 from the average SOC value SOC_avg of all the battery packs 11-14 is greater than the allowable error σ (No in S17), the controller 20 performs the process for equalizing the SOCs of the battery packs 11-14 by discharging at least some of the battery packs 11-14 using the sheath heaters 35-38 (S15, S16, S18 and S19).

In more detail, in S14 of FIG. 2, the controller 20 determines whether or not the first SOC deviation acquired by subtracting the average SOC value SOC_avg of all the battery packs 11-14 from the SOC value SOC_N of each of the battery packs 11-14 is greater than the allowable error σ by comparing the first SOC deviation with the allowable error σ.

Here, when among all the battery packs 11-14, there is any battery pack having a first SOC deviation greater than the allowable error σ, the controller 20 determines the battery pack having the first SOC deviation greater than the allowable error σ as a battery pack which is required to be discharged for equalization of the SOCs of the battery packs 11-14.

Thereafter, in S15, the battery pack having the first SOC deviation greater than the allowable error σ is discharged using the corresponding sheath heater 35, 36, 37 or 38. Here, the controller 20 turns on the load-side relay 31, 32, 33 or 34 corresponding to the sheath heater 35, 36, 37 or 38 connected to the corresponding battery pack to operate the corresponding sheath heater 35, 36, 37 or 38, discharging the battery pack having the first SOC deviation greater than the allowable error σ.

The battery pack having the first SOC deviation, acquired by subtracting the average SOC value SOC_avg from the SOC value SOC_N of the battery pack, which is greater than the allowable error σ, is a battery pack in a high SOC state which has an SOC value SOC_N excessively greater than the average SOC value SOC_avg and thus requires equalization. In various exemplary embodiments of the present invention, the controller 20 determines whether or not there is any battery pack required to be discharged for equalization among the battery packs 11-14 and which one requires equalization among the battery packs 11-14 by comparing the first SOC deviations of the respective battery packs 11-14 with the allowable error σ.

In various exemplary embodiments of the present invention, the battery pack having the first SOC deviation greater than the allowable error σ is a battery pack in the high SOC state which is not balanced with other battery packs in terms of SOC, and requires SOC equalization with the other battery packs, the first SOC deviations of which are within the allowable error σ. In various exemplary embodiments of the present invention, the controller 20 may determine a battery pack required to be discharged for equalization among the battery packs 11-14 by comparing the first SOC deviations of the respective battery packs 11-14, acquired by subtracting the average SOC value SOC_avg from the SOC values SOC_N of the battery packs 11-14, with the allowable error σ.

As described above, the controller 20 may determine whether or not there is any battery pack required to be discharged for equalization by determining whether or not the first SOC deviations of the respective battery packs 11-14, acquired by subtracting the average SOC value SOC_avg of all the battery packs 11-14 from the SOC values SOC_N (here N=A, B, C, D) of the respective battery packs 11-14, is greater than the allowable error σ (i.e., SOC_N−SOC_avg>σ?).

Alternatively, the controller 20 may determine whether or not the SOC value SOC_N of each of the battery packs 11-14 is greater than an allowable upper SOC limit SOC_limit_upper (SOC_avg+σ), acquired by adding the allowable error σ to the average SOC value SOC_avg of all the battery packs 11-14 (SOC_N>SOC_avg+σ (=SOC_limit_upper)?), and upon determining that the SOC value SOC_N of a battery pack is greater than the allowable upper SOC limit, determines the present battery pack as a battery pack requiring equalization.

Of course, the two above-described determination conditions, i.e., the condition of SOC_N−SOC_avg>σ using the first SOC deviations of the respective battery packs 11-14 and the condition of SOC_N>SOC_avg+σ using the allowable upper SOC limit (=SOC_avg+σ=SOC_limit_upper) have the same mathematical meaning.

When equalization in S15 is performed, to equalize the determined battery pack in the high SOC state, the controller 20 operates the sheath heater 35, 36, 37 or 38 connected to the determined battery pack in the high SOC state to discharge the determined battery pack in the high SOC state, and to discharge the determined battery pack in the high SOC state, the controller 20 operates the load-side relay 31, 32, 33 or 34 corresponding to the sheath heater 35, 36, 37 or 38 to operate the corresponding sheath heater 35, 36, 37 or 38.

Further, during discharging of the determined battery pack in the high SOC state, the controller 20 integrates a current value, consumed due to operation of the corresponding sheath heater 35, 36, 37 or 38, in the battery pack which is being discharged in real time, and determines the real-time SOC value of the battery pack which is being discharged based on the integrated current value and the SOC value of the battery pack before discharging. In various exemplary embodiments of the present invention, in determination of the SOC value of the battery pack which is being discharged in real time, the controller 20 may estimate the current value of the battery pack, consumed by the corresponding sheath heater.

That is, the SOC value of the battery pack which is being discharged may be determined as a function value of current. Here, the current may be estimated using the voltage values of the battery packs 11-14 detected by the voltage sensors 15-18 and the resistance values of the sheath heaters 35-38 connected to the battery packs 11-14.

Because current is continuously consumed by the sheath heater while the battery pack is discharged due to operation of the sheath heater, the real-time SOC value of the corresponding battery pack is lowered. Here, when the first SOC deviation of the corresponding battery pack, acquired by subtracting the average SOC value determined before discharging from the real-time SOC value of the corresponding battery pack, is within the allowable error σ, the controller 20 turns off the load-side relay 31, 32, 33 or 34 corresponding to the sheath heater 35, 36, 37 or 38 to stop operation of the sheath heater 35, 36, 37 or 38, and terminates discharging of the corresponding battery pack.

For example, when the first SOC deviation of the corresponding battery pack, acquired by subtracting the average SOC value determined before discharging from the real-time SOC value of the corresponding battery pack determined during discharging, is 0, which is to say, when the real-time SOC value of the corresponding battery pack determined during discharging coincides with the average SOC value determined before discharging, the controller 20 turns off the load-side relay 31, 32, 33 or 34 corresponding to the sheath heater 35, 36, 37 or 38 to stop operation of the sheath heater 35, 36, 37 or 38, and terminates discharging of the corresponding battery pack.

On the other hand, in S14, when all the battery packs 11-14 satisfy the condition of SOC_N−SOC_avg≤σ or when all the battery packs 11-14 satisfy the condition of SOC_N−≤SOC_avg+σ, the controller 20 compares the second SOC deviations, acquired by subtracting the SOC values SOC_N of the respective battery packs 11-14 from the average SOC value SOC_avg of all the battery packs 11-14, with the allowable error σ (S17).

Here, the average SOC value is the average SOC value determined in S13. As results of comparison, when among the battery packs 11-14, there is any battery pack having a second SOC deviation greater than the allowable error σ, i.e., there is any battery pack in a low SOC state satisfying the condition of SOC_avg-SOC_N>σ, the controller 20 determines the remaining battery packs other than the battery pack in the low SOC state as battery packs required to be discharged.

Thereafter, in S18, the controller 20 discharges the remaining battery packs other than the battery pack in the low SOC state, i.e., the battery packs required to be discharged, using the respective sheath heaters connected to the remaining battery packs. Here, the controller 20 turns on the load-side relays corresponding to the sheath heaters connected to the remaining battery packs to operate the corresponding sheath heaters, discharging the remaining battery packs.

The battery pack having the second SOC deviation, acquired by subtracting the SOC value SOC_N of the battery pack from the average SOC value SOC_avg of all the battery packs 11-14, which is greater than the allowable error σ, is a battery pack which has a low SOC value to be less than the average SOC value, and thus requires equalization.

Accordingly, in S17, the controller 20 determines whether or not there is any battery pack in the low SOC state having an SOC value SOC_N much less than the average SOC value among the battery packs 11-14, and which one requires equalization among the battery packs 11-14.

In S17, the battery pack having the second SOC deviation, acquired by subtracting the SOC value SOC_N thereof from the average SOC value SOC_avg of all the battery packs 11-14, which is greater than the allowable error σ, is a battery pack which is not balanced with other battery packs in terms of SOC and requires SOC equalization with the other battery packs, the second SOC deviations of which are within the allowable error σ. In various exemplary embodiments of the present invention, the controller 20 may determine a battery pack which requires equalization by comparing the second SOC deviations of the respective battery packs 11-14, acquired by subtracting the SOC values SOC_N of the battery packs 11-14 from the average SOC value SOC_avg, with the allowable error σ.

As described above, the controller 20 may determine whether or not there is any battery pack in the low SOC state requiring equalization by determining whether or not the second SOC deviations of the respective battery packs 11-14, acquired by subtracting the SOC values SOC_N of the respective battery packs 11-14 from the average SOC value SOC_avg of all the battery packs 11-14, is greater than the allowable error σ (i.e., SOC_avg-SOC_N>σ?).

Alternatively, the controller 20 may determine whether or not the SOC value SOC_N of each of the battery packs 11-14 is less than an allowable lower SOC limit SOC_limit_lower (SOC_avg−σ), acquired by subtracting the allowable error σ from the average SOC value SOC_avg of all the battery packs 11-14 (SOC_avg−σ (=SOC_limit_lower)>SOC_N?), and upon determining that the SOC value SOC_N of any battery pack is less than the allowable lower SOC limit, determines the present battery pack as a battery pack requiring equalization.

Of course, the two above-described determination conditions, i.e., the condition of SOC_avg-SOC_N>σ using the second SOC deviations (=SOC_avg-SOC_N) of the respective battery packs 11-14 and the condition of SOC_avg-σ>SOC_N using the allowable lower SOC limit (=SOC_avg-σ=SOC_limit_lower) have the same mathematical meaning.

When equalization in S18 is performed, the controller 20 equalizes the SOCs of the battery packs 11-14 by lowering the SOCs of the remaining battery packs other than the battery pack in the low SOC state, for the present purpose, the controller 20 operates the sheath heaters connected to the remaining battery packs to discharge the remaining battery packs, and to discharge the remaining battery packs, the controller 20 operates the load-side relays corresponding to the sheath heaters connected to the remaining battery packs to operate the corresponding sheath heaters.

Among the remaining battery packs other than the determined battery pack (the battery pack in the low SOC state), all the remaining battery packs may be discharged using the sheath heaters thereof, or only the battery packs having the SOC values greater than the average SOC value SOC_avg of all the battery packs 11-14 may be discharged using the sheath heaters thereof.

Before discharging, the controller 20 stores the SOC values of the remaining battery packs and the average SOC value of all the battery packs 11-14 in advance, and stores differences between the SOC values of the remaining battery packs and the average SOC value in advance. Further, the controller 20 determines the discharge quantities of the battery packs to be discharged before discharging, and changes the SOCs of the battery packs by the determined discharge quantities, and the discharge quantities of the battery packs are determined as 1/n of the differences between the SOC values of the battery packs before discharging and the average SOC value. Here, n may be a predetermined value which is greater than 1, for example, may be 2.

Further, during discharging of the battery packs, the controller 20 integrates current values, consumed due to operation of the corresponding sheath heaters, in the battery packs which are being discharged in real time, and determines the real-time SOC values of the battery packs which are being discharged based on the integrated current values. Further, the controller 20 determines differences between the SOC values of the battery packs which are being discharged before discharging and the real-time SOC values of the battery packs which are being discharged during discharging as real-time SOC changes.

Further, when the real-time SOC changes of the battery packs which are being discharged reach 1/n of the differences between the SOC values of the battery packs before discharging and the average SOC value (i.e., the determined discharging quantities of the battery packs), the controller 20 turns off the load-side relays corresponding to the sheath heaters connected to the battery packs which are being discharged to stop operation of the sheath heaters, and terminates discharging of the battery packs (S19).

For example, upon determining that there is one battery pack in the low SOC state having a second SOC deviation, acquired by subtracting the SOC value thereof from the average SOC value of the four battery packs 11-14, the three remaining battery packs may be discharged by operating the sheath heaters thereof. Here, the controller 20 discharges the three remaining battery packs as much as the determined discharging quantities of the respective battery packs.

In various exemplary embodiments of the present invention, the SOC values of the three remaining battery packs are greater than the SOC value of the battery pack in the low SOC state. Because, to facilitate equalization by increasing the SOC value of the battery pack in the low SOC state, an active balancing system requiring additional cost must be used, in various exemplary embodiments of the present invention, the SOCs of all the battery packs 11-14 are maximally equalized by maintaining the SOC value of the battery pack in the low SOC state and discharging the three remaining battery packs having the relatively high SOC values.

However, when all the SOC values of the three remaining battery packs coincide with the average SOC value of all the battery packs 11-14, the total discharge quantity of the three remaining battery packs may be excessive. In various exemplary embodiments of the present invention, when the battery packs are discharged by operating the sheath heaters thereof, as described above, a loss in electrical energy is accepted for equalization of the SOCs of all the battery packs unless heat generated from the sheath heaters is separately used. Therefore, it is necessary to restrict the power consumption and the electrical energy loss of the battery packs for equalization to appropriate levels.

Therefore, the discharge quantities of the three remaining battery packs are restricted to 1/n of the differences between the SOC values of the battery packs before discharging and the average SOC value. That is, when the real-time SOC changes of the battery packs which are being discharged reach ½ of the differences between the SOC values of the battery packs before discharging and the average SOC value, the controller 20 turns off the load-side relays corresponding to the sheath heaters connected to the battery packs which are being discharged to stop operation of the sheath heaters, and terminates discharging of the battery packs.

As described above, in the method for equalizing the SOCs of the battery packs according to various exemplary embodiments of the present invention, the controller confirms whether or not there is any battery pack requiring SOC equalization among all the battery packs using the average SOC value of all the battery packs and the SOC values of the respective battery packs in the key-off state of the electric vehicle and in the off state of the main relays thereof, and upon confirming that there is any battery pack requiring equalization, operates a corresponding sheath heater by a necessary discharging quantity based on the average SOC value and the SOC value of the battery pack requiring equalization to discharge some battery packs, being configured for appropriately achieving equalization of the SOCs of all the battery packs.

Further, in the method according to various exemplary embodiments of the present invention, the SOC values of the respective battery packs may be estimated under an open-circuit voltage (OCV) condition, in which the SOC values of the respective battery packs are configured for being accurately estimated in the key-off state of the electric vehicle and in the off state of the main relays thereof, to facilitate accurate determination, and SOC equalization of the battery packs may be performed maximally using hardware mounted in advance in the electric vehicle to reduce costs and to improve marketability of the electric vehicle.

As is apparent from the above description, in a method for equalizing the SOCs of battery packs in an electric vehicle according to various exemplary embodiments of the present invention, a controller confirms whether or not there is any battery pack requiring SOC equalization among all the battery packs using an average SOC value of all the battery packs and SOC values of the respective battery packs in the key-off state of the electric vehicle and in the off state of main relays thereof, and upon confirming that there is any battery pack requiring equalization, operates a corresponding sheath heater by a necessary discharging quantity based on the average SOC value and the SOC value of the battery pack requiring equalization to discharge some battery packs, being configured for appropriately achieving equalization of the SOCs of all the battery packs.

Further, in the method according to various exemplary embodiments of the present invention, the SOC values of the respective battery packs may be estimated under an open-circuit voltage (OCV) condition, in which the SOC values of the respective battery packs are configured for being accurately estimated in the key-off state of the electric vehicle and in the off state of the main relays thereof, to facilitate accurate determination, and SOC equalization of the battery packs may be performed maximally using hardware mounted in advance in the electric vehicle to reduce costs and to improve marketability of the electric vehicle.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for equalizing states of charge (SOCs) of battery packs in an electric vehicle, the method comprising:
    acquiring, by a controller, SOC information of the battery packs from battery pack state information acquired by state detectors under predetermined conditions of the electric vehicle;
    determining, by the controller, an average SOC value of the battery packs based on acquired SOC values of respective battery packs;
    determining, by the controller, at least one battery pack required to be discharged for equalization of the SOCs of the battery packs among all the battery packs based on the SOC values of the respective battery packs and the determined average SOC value of the battery packs; and
    operating, by the controller, an electric load connected to the at least one determined battery pack required to be discharged to discharge the at least one determined battery pack required to be discharged,
    wherein the determining of, by the controller, the at least one battery pack required to be discharged includes:
        determining, by the controller, an allowable upper SOC limit, acquired by adding a predetermined allowable error to the average SOC value of the battery packs;
        comparing, by the controller, the SOC values of the respective battery packs with the determined allowable upper SOC limit; and
        determining, by the controller, one or more battery packs having an SOC value greater than the allowable upper SOC limit among all the battery packs as the at least one battery pack required to be discharged.

2. The method of claim 1, wherein the predetermined conditions of the electric vehicle include a key-off state of the electric vehicle and an off state of main relays of the electric vehicle.

3. The method of claim 1, wherein, in the acquiring of, by the controller, the SOC information of the battery packs:
    the state detectors include voltage sensors connected to the respective battery packs; and the controller is configured to determine the SOC values of the battery packs corresponding to voltage values of the battery packs detected by the voltage sensors.

4. The method of claim 1, wherein, in the operating of, by the controller, the electric load connected to the at least one determined battery pack required to be discharged to discharge the at least one determined battery pack required to be discharged, the controller is configured:

while operating the electric load to discharge the at least one determined battery pack, to determine a real-time SOC value of a battery pack which is being discharged; and to stop operation of the electric load to terminate discharging of the battery pack, when a first SOC deviation, acquired by subtracting the average SOC value of the battery packs determined before discharging from the real-time SOC value determined during discharging, is within the predetermined allowable error.

5. The method of claim 4, wherein the controller is configured to estimate a current value consumed due to operation of the electric load connected to the battery pack which is being discharged during discharging using a voltage value of the battery pack which is being discharged, detected by a voltage sensor, and a resistance value of the electric load connected to the battery pack which is being discharged, and to determine the real-time SOC value of the battery pack which is being discharged based on an integrated current value, acquired by integrating the estimated current value, and an SOC value of the battery pack which is being discharged before discharging.

6. The method of claim 1, wherein the electric loads are sheath heaters provided to heat coolant to control temperatures of the battery packs, connected to the respective battery packs to consume electrical energy of the respective battery packs, and configured so that on-off operations thereof are controlled by the controller.

7. The method of claim 6, wherein the controller is configured to control operations of the sheath heaters of the respective battery packs by controlling on-off operations of load-side relays provided in electric circuits between the respective battery packs and the corresponding sheath heaters.

8. A method for equalizing states of charge (SOCs) of battery packs in an electric vehicle, the method comprising:

acquiring, by a controller, SOC information of the battery packs from battery pack state information acquired by state detectors under predetermined conditions of the electric vehicle; determining, by the controller, an average SOC value of the battery packs based on acquired SOC values of respective battery packs;

determining, by the controller, at least one battery pack required to be discharged for equalization of the SOCs of the battery packs among all the battery packs based on the SOC values of the respective battery packs and the determined average SOC value of the battery packs; and operating, by the controller, an electric load connected to the at least one determined battery pack required to be discharged to discharge the at least one determined battery pack required to be discharged, wherein the determining of, by the controller, the at least one battery pack required to be discharged includes:

determining, by the controller, first SOC deviations of the respective battery packs, acquired by subtracting the average SOC value of the battery packs from the SOC values of the respective battery packs;

comparing, by the controller, the first SOC deviations thus determined of the respective battery packs with a predetermined allowable error; and determining, by the controller, one or more battery packs having the first SOC deviation greater than the predetermined allowable error among all the battery packs as the at least one battery pack required to be discharged, and wherein, in the operating of, by the controller, the electric load connected to the at least one determined battery pack required to be discharged to discharge the at least one determined battery pack required to be discharged, the controller is configured:

while operating the electric load to discharge the at least one determined battery pack, to determine a real-time SOC value of a battery pack which is being discharged; and to stop operation of the electric load to terminate discharging of the battery pack, when a first SOC deviation, acquired by subtracting the average SOC value of the battery packs determined before discharging from the real-time SOC value determined during discharging, is within the predetermined allowable error.

9. The method of claim 8, wherein the controller is configured to estimate a current value consumed due to operation of the electric load connected to the battery pack which is being discharged during discharging using a voltage value of the battery pack which is being discharged, detected by a voltage sensor, and a resistance value of the electric load connected to the battery pack which is being discharged, and to determine the real-time SOC value of the battery pack which is being discharged based on an integrated current value, acquired by integrating the estimated current value, and an SOC value of the battery pack which is being discharged before discharging.

10. A method for equalizing states of charge (SOCs) of battery packs in an electric vehicle, the method comprising:

acquiring, by a controller, SOC information of the battery packs from battery pack state information acquired by state detectors under predetermined conditions of the electric vehicle;

determining, by the controller, an average SOC value of the battery packs based on acquired SOC values of respective battery packs;

determining, by the controller, at least one battery pack required to be discharged for equalization of the SOCs of the battery packs among all the battery packs based on the SOC values of the respective battery packs and the determined average SOC value of the battery packs; and operating, by the controller, an electric load connected to the at least one determined battery pack required to be discharged to discharge the at least one determined battery pack required to be discharged, wherein the determining of, by the controller, the at least one battery pack required to be discharged includes:

determining, by the controller, second SOC deviations of the respective battery packs, acquired by subtracting the SOC values of the respective battery packs from the average SOC value of the battery packs;

comparing, by the controller, the second SOC deviations thus determined of the respective battery packs with a predetermined allowable error; and determining, by the controller, remaining battery packs other than a battery pack having the second SOC deviation greater than the predetermined allowable error among all the battery packs as the at least one battery pack required to be discharged.

11. The method of claim 10, wherein, in the operating of, by the controller, the electric load connected to the at least one determined battery pack required to be discharged to discharge the at least one determined battery pack required to be discharged, the controller is configured:
to determine discharge quantities of the remaining battery packs as 1/n of differences between each of the SOC values of the remaining battery packs before discharging and the average SOC value of the battery packs, wherein the n is a predetermined value greater than 1;
while operating the electric loads to discharge the remaining battery packs, to determine real-time SOC values of the remaining battery packs which are being discharged; and
to stop operation of the electric loads to terminate discharging of the remaining battery packs, when the determined real-time SOC values reach the discharge quantities during discharging.

12. The method of claim 11, wherein the controller is configured to estimate current values consumed due to operation of the electric loads connected to the battery packs which are being discharged during discharging using voltage values of the battery packs which are being discharged, detected by voltage sensors, and resistance values of the electric loads connected to the battery packs which are being discharged, and to determine the real-time SOC values of the battery packs which are being discharged based on integrated current values, acquired by integrating the estimated current values, and SOC values of the battery packs which are being discharged before discharging.

13. A method for equalizing states of charge (SOCs) of battery packs in an electric vehicle, the method comprising:
acquiring, by a controller, SOC information of the battery packs from battery pack state information acquired by state detectors under predetermined conditions of the electric vehicle;
determining, by the controller, an average SOC value of the battery packs based on acquired SOC values of respective battery packs;
determining, by the controller, at least one battery pack required to be discharged for equalization of the SOCs of the battery packs among all the battery packs based on the SOC values of the respective battery packs and the determined average SOC value of the battery packs; and
operating, by the controller, an electric load connected to the at least one determined battery pack required to be discharged to discharge the at least one determined battery pack required to be discharged,
wherein the determining of, by the controller, the at least one battery pack required to be discharged includes:
determining, by the controller, an allowable lower SOC limit, acquired by subtracting a predetermined allowable error from the average SOC value of the battery packs;
comparing, by the controller, the SOC values of the respective battery packs with the allowable lower SOC limit thus determined; and
determining, by the controller, remaining battery packs other than battery packs having the SOC value less than the allowable lower SOC limit among all the battery packs as the at least one battery pack required to be discharged.

14. The method of claim 13, wherein, in the operating of, by the controller, the electric load connected to the at least one determined battery pack required to be discharged to discharge the at least one determined battery pack required to be discharged, the controller is configured:
to determine discharge quantities of the remaining battery packs as 1/n of difference between each of SOC values of the remaining battery packs before discharging and the average SOC value of the battery packs, wherein the n is a predetermined value greater than 1;
while operating the electric loads to discharge the remaining battery packs, to determine real-time SOC values of the remaining battery packs which are being discharged; and
to stop operation of the electric loads to terminate discharging of the remaining battery packs, when the determined real-time SOC values reach the discharge quantities during discharging.

15. The method of claim 14, wherein the controller is configured to estimate current values consumed due to operation of the electric loads connected to the battery packs which are being discharged during discharging using voltage values of the battery packs which are being discharged, detected by voltage sensors, and resistance values of the electric loads connected to the battery packs which are being discharged, and to determine the real-time SOC values of the battery packs which are being discharged based on integrated current values, acquired by integrating the estimated current values, and the SOC values of the battery packs which are being discharged before discharging.

16. The method of claim 13, wherein, in the operating of, by the controller, the electric load connected to the at least one determined battery pack required to be discharged to discharge the at least one determined battery pack required to be discharged, the controller is configured to discharge battery packs having SOC values greater than the average SOC value of the battery packs by operating the electric loads connected thereto, among the determined at least one battery pack required to be discharged.

17. An apparatus of equalizing states of charge (SOCs) of battery packs, the apparatus comprising:
the battery packs;
state detectors; and
at least a sheath heater connected to at least one of the battery packs and provided to heat coolant to control temperatures of the battery packs, connected to the respective battery packs to consume electrical energy of the respective battery packs;
a controller, wherein the controller is configured for:
acquiring SOC information of the battery packs from battery pack state information acquired by the state detectors under predetermined conditions of an electric vehicle;
determining an average SOC value of the battery packs based on the acquired SOC values of respective battery packs;
determining at least one battery pack required to be discharged for equalization of the SOCs of the battery packs among all the battery packs based on the SOC values of the respective battery packs and the determined average SOC value of the battery packs; and
operating the at least a sheath heater connected to the at least one determined battery pack required to be discharged to discharge the at least one determined battery pack required to be discharged.

* * * * *